(No Model.)
J. C. SMITH & L. B. BARKER.
STEAM COOKER.
No. 382,286. Patented May 1, 1888.
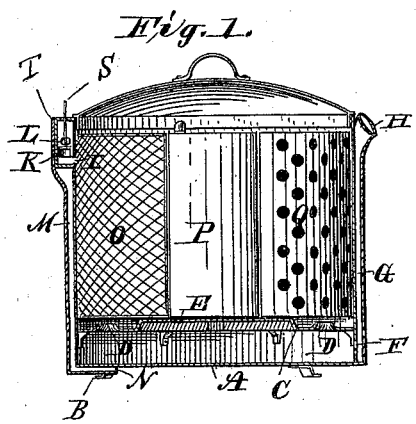
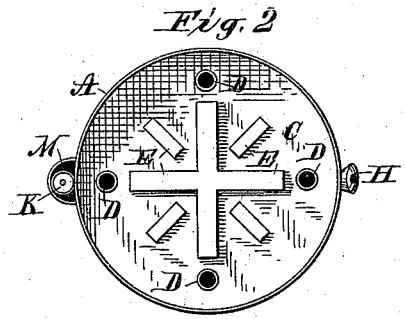
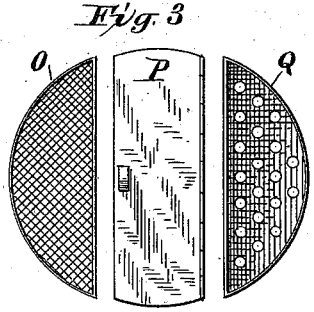
Witnesses.
E. H. Campbell,
Ned. Campbell.
J. Crawford Smith,
Lucien B. Barker,
Inventors
C. D. Campbell,
Attorney.

UNITED STATES PATENT OFFICE.

JOHN CRAWFORD SMITH AND LUCIEN B. BARKER, OF BELLEFONTAINE, OHIO.

STEAM-COOKER.

SPECIFICATION forming part of Letters Patent No. 382,286, dated May 1, 1888.

Application filed April 21, 1887. Serial No. 235,702. (No model.)

*To all whom it may concern:*

Be it known that we, JOHN CRAWFORD SMITH and LUCIEN B. BARKER, citizens of the United States, and residents of Bellefontaine, in the county of Logan and State of Ohio, have invented a new and useful Steam-Cooker, of which the following is a specification.

Our invention relates to an improved and simplified steam-cooker that will automatically give notice if the water runs too low, and will also automatically indicate when steam is up, and how much, and, further, provides an escape for any excess of steam.

Figure 1 is a longitudinal vertical section; Fig. 2, a top plan view of the shelf; Fig. 3, a top plan of perforated cups.

The operation of our device is as follows: Our cooker in practice we prefer to make of oval form, though it may be of any desired shape. About an inch of water is placed in it, not quite reaching the shelf C, that rests upon the swell B on the inside of the cooker. The articles to be cooked are then placed in a pan, cup, or dish on the shelf, or on the shelf itself, and the lid is placed on the cooker. When the steam rises, the cooking begins, and the rising steam enters the tube T through the port I, and forces the indicator-valve L upward in the tube T, the stem S being carried up with it and indicating that the articles are cooking, and the height to which the stem rises the degree, doing away with the necessity of taking off the lid to see how things are getting along.

Should the steam pressure become greater than desired in the cooker, the valve K is carried up above the port L in the tube T, whence the excess of steam escapes down through the tube M on the outside of the cooker into the fire beneath the cooker. If at any time the water runs too low in the cooker, the moment it falls below the port F steam escapes up through the tube G on the outside of the cooker and blows the whistle H, when the whistle can be removed from the tube and water supplied again through the tube. The shelf C is provided with holes D for the passage of steam therethrough, and with a series of raised supports or ribs, E, diverging from the center, which hold the vessels or pans above the shelf high enough to allow free circulation of steam beneath them. These ribs are each independent of the others, having a free space for the passage of steam all around each. It is often desirable to cook a small amount each of several different kinds—as apples, potatoes, turnips, &c.—at the same time, and keep them separate, as each may require a different length of cooking. For this purpose we provide a series of metallic perforated cups or woven-wire cups, O P Q, that fit snugly in the cooker, so that the articles in each may be kept separate from the others and removed separately as desired. These cups may be made tight, except the perforations at the bottom, to prevent the commingling of odors from different articles.

In the drawings we have shown our cooker of cylindrical form; but in practice we prefer to make them oval in form, as larger vessels can be placed side by side on stoves where the holes are close together.

What we claim is—

In a steam-cooker, the steam-chamber A, tube T, having port I for the admission of steam to the tube, and port L for the exit of steam therefrom, and the valve K, that indicates when sufficient steam for cooking is raised, and which rises high enough to allow extra pressure of steam to pass through the escape-port, as and for the purpose set forth.

JOHN CRAWFORD SMITH.
LUCIEN B. BARKER.

Witnesses:
JOSEPH J. MOHR,
W. ED. THRIFFT.